US007213822B1

(12) United States Patent
Webster

(10) Patent No.: US 7,213,822 B1
(45) Date of Patent: May 8, 2007

(54) MEDICATION CART WITH HEIGHT ADJUSTMENT

(75) Inventor: John H. Webster, Winnipeg (CA)

(73) Assignee: Manrex Limited, Winnipeg, Manitoba (CA)

( * ) Notice: Subject to any disclaimer, the term of this patent is extended or adjusted under 35 U.S.C. 154(b) by 0 days.

(21) Appl. No.: 11/259,351

(22) Filed: Oct. 27, 2005

(51) Int. Cl.
*B62B 3/02* (2006.01)

(52) U.S. Cl. ............... 280/79.3; 280/47.34; 280/47.35; 254/7 R

(58) Field of Classification Search ............... 280/79.3, 280/33.996, 47.18, 47.35, 47.34; 312/249.8, 312/249; 414/495; 254/6 R, 6 B, 7 R, 7 B, 254/84, 89 R; 269/17, 296, 71; 187/244, 187/270

See application file for complete search history.

(56) References Cited

U.S. PATENT DOCUMENTS 2,258,133 A * 10/1941 Chuma .................... 108/50.11
3,195,859 A * 7/1965 Jackson et al. ............. 254/2 R
5,290,058 A * 3/1994 Adams et al. .............. 280/651
5,702,115 A * 12/1997 Pool ........................ 280/47.35
5,716,186 A * 2/1998 Jensen et al. ............... 414/458
5,765,842 A * 6/1998 Phaneuf et al. .......... 280/47.35
6,752,379 B1 * 6/2004 Wall ........................... 254/7 R
6,773,081 B2 * 8/2004 Yuyama et al. ............. 312/321
7,093,691 B1 * 8/2006 Vaughan et al. ............ 187/269
2001/0035702 A1 * 11/2001 Murphy et al. ............. 312/229
2005/0001395 A1 * 1/2005 Fuentes ................... 280/47.35
2005/0140106 A1 * 6/2005 Huguet ....................... 280/79.3
2005/0236940 A1 * 10/2005 Rockoff ....................... 312/209
2006/0255553 A1 * 11/2006 Gust et al. ............... 280/47.34

FOREIGN PATENT DOCUMENTS

WO WO 2004/076604 A2 9/2004

* cited by examiner

*Primary Examiner*—J. Allen Shriver
(74) *Attorney, Agent, or Firm*—Adrian D. Battison; Michael R. Williams; Ryan W. Dupuls

(57) ABSTRACT

A medication cart a includes a housing mounted on four posts at corners of the housing with a generally horizontal counter top at the top of the housing and a plurality of drawers in the housing underneath the counter top having locations therein for containing medications and for containing data charts relating to medications to be dispensed to a number of patients. The housing is mounted on a base with a plurality of ground wheels for movement by an operator over the ground to different locations to service a series of patients with the medications. A lifting mechanism for lifting the housing relative to the base is defined by four threaded rods each extending generally upwardly between the base and the housing with a lower end of each rod attached to the base and an upper end extending into a respective post. A nut on each rod is connected to the housing such that rotation of the rods causes axial movement of the nut along the rod and lifting of the housing relative to the base. The rods are driven by a hand crank at the top of one rod and a chain and sprocket drive arrangement connecting between the rods at the base.

18 Claims, 6 Drawing Sheets

MEDICATION CART WITH HEIGHT ADJUSTMENT

FIELD OF THE INVENTION

The present invention relates to a medication cart of the type comprising a housing defining a generally horizontal counter top providing a work surface for receiving work materials involved in dispensing medications and a plurality of drawers underneath the counter top for containing medications and for containing data charts relating to medications to be dispensed to a number of patients, where the housing is mounted on a base with ground wheels to be moved by an operator over the ground to different locations to service a series of patients with the medications.

BACKGROUND OF THE INVENTION

Medication carts of this type have become widely used in institutional settings for transporting and supplying medications to the patients. Carts of this type generally include a series of drawers and other compartments which are provided to contain the medications for the different patients together with the charts or other data which are used for the patient to record and identify the medications involved.

One form of cart manufactured by Manrex who are the assignee of the present application includes a housing defined by frame members including four posts which sit on a base including ground wheels by which the operator can move the cart from place to place. Carts of this type are relatively inexpensive and have obtained widespread acceptance.

Other designs of cart are manufactured by other companies for basically the same purpose and include the same general components including a work top surface on which the materials are placed prior to or during dispensing. One problem that has arisen is that of locating the worktop surface at a suitable height for different height operators. For many years operators of different heights have accepted that it is necessary for them to accommodate equipment which is insufficiently adjustable or inadequately adjusted. However in recent years it has become much more acquired that equipment of this type be adjustable to accommodate the differing height of the operators who may be involved in using the equipment. This is particularly necessary in an institutional situation where management and employees are very sensitive to situations which may cause or exacerbate medical difficulties amongst the operators.

Previous designs have therefore been provided of a cart of this type in which a height adjustment can be provided for adjusting the distance of the worktop surface from the floor. One example is shown in PCT published application 2004/076604 published Sep. 10, 2004 by Rubbermaid Commercial Products LLC. This arrangement includes an upper housing having a series of compartments which is mounted on a single post where the post is carried at its lower end on a wheeled base. The post includes a sleeve type arrangement by which the height of the post can be adjusted.

SUMMARY OF THE INVENTION

It is an object of the present invention to provide an improved medication cart which is more ergonomically suitable for different height operators.

According to a first aspect of the invention there is provided a medication cart comprising:

a frame having a plurality of upstanding posts at spaced corners of the frame;

a generally horizontal counter top connected to the frame and providing a work surface for receiving work materials involved in dispensing medications;

a plurality of drawers carried on the frame underneath the counter top for sliding movement from a closed position within the frame to an open position allowing access to an interior of the drawers;

the drawers having locations therein for containing medications and for containing data charts relating to medications to be dispensed to a number of patients;

a base for supporting the frame and the drawers therein;

a plurality of ground wheels mounted on the base by which the base and the frame carried thereon can be wheeled by an operator over the ground to different locations to service a series of patients with the medications;

each of the posts having a screw lifting jack mounted therein by which the post and the frame can be lifted relative to the base to raise the height of the counter top to accommodate different heights of the operator;

and a drive transmission for transferring drive to each of the screw lifting jacks for simultaneous actuation of the screw lifting jacks to raise the frame relative to the base.

Preferably each screw lifting jack includes a threaded rod extending longitudinally of the respective post within the respective post and a nut mounted on the threaded rod.

Preferably the drive transmission is arranged to drive rotation of the threaded rods and wherein each nut is mounted on the frame such that rotation of the threaded rod causes movement of the nut along the threaded rod and lifting of the frame. However as an alternative, the rods may be stationary and the nuts commonly driven by a common drive system. The nuts are preferably coupled to the frame with the rods fixed to the base since the base is close to the ground and sufficient movement of the housing is obtained by holding the rod in fixed axial position on the base and by moving the nuts along the rods. However in alternative arrangements the rods may be moved axially and nuts held stationary. The term "nut" used herein is intended to include any element which has a threaded internal female thread for engaging the rod and is not intended to be limited to any particular external shape of the nut. Thus the nut may be formed by a sleeve.

Preferably the drive transmission includes a drive coupling mounted on the base for communicating drive to each of the threaded rods.

Preferably one threaded rod includes an element thereof which extends to a top of the respective post and carries a drive member at the top such that drive to all of the threaded rods is communicated from the drive member. This is particularly convenient for the operator in that the drive member is readily available at the top of the housing. However the drive may be communicated to the rods at any other suitable location.

Preferably the drive member comprises a hand crank. However a motor may be provided powered by any suitable source preferably a battery.

Preferably the drive coupling comprises an endless flexible drive member which passes around a drive connection to each of the rods.

Preferably the endless flexible drive member comprises a chain which engages a sprocket on the respective rod. However timing belts and other drive connecting members of a similar nature which maintains common drive between the sprockets can be used.

According to a second aspect of the invention there is provided a medication cart comprising:

a frame having a plurality of upstanding posts at spaced corners of the frame;

a generally horizontal counter top connected to the frame and providing a work surface for receiving work materials involved in dispensing medications;

a plurality of drawers carried on the frame underneath the counter top for sliding movement from a closed position within the frame to an open position allowing access to an interior of the drawers;

the drawers having locations therein for containing medications and for containing data charts relating to medications to be dispensed to a number of patients;

a base for supporting the frame and the drawers therein;

a plurality of ground wheels mounted on the base by which the base and the frame carried thereon can be wheeled by an operator over the ground to different locations to service a series of patients with the medications;

each of the posts having a threaded rod therein extending axially therealong with a lower end of each rod attached to the base;

each threaded rod having mounted thereon a respective nut connected to the frame such that rotation of the rods causes axial movement of the nut along the rod and lifting of the frame relative to the base;

and a drive transmission for transferring drive to each of the threaded rods for simultaneous rotation of the threaded rods to raise the frame relative to the base.

According to a third aspect of the invention there is provided a medication cart comprising:

a housing;

a generally horizontal counter top at the top of the housing and providing a work surface for receiving work materials involved in dispensing medications;

a plurality of drawers in the housing underneath the counter top for sliding movement from a closed position within the frame to an open position allowing access to an interior of the drawers;

the drawers having locations therein for containing medications and for containing data charts relating to medications to be dispensed to a number of patients;

a base for supporting the housing and the drawers therein;

a plurality of ground wheels mounted on the base by which the base and the frame carried thereon can be wheeled by an operator over the ground to different locations to service a series of patients with the medications;

a lifting mechanism for lifting the housing relative to the base including a plurality of threaded rods extending generally upwardly between the base and the housing with a lower end of each rod attached to the base;

each threaded rod having mounted thereon a respective nut such that rotation of the rods causes axial movement of the nut along the rod and lifting of the housing relative to the base;

and a drive transmission for transferring drive to each of the lifting mechanisms for simultaneous action in lifting the housing relative to the base including an endless flexible drive member extending around each of the lifting mechanisms in turn and a drive coupling connected between the endless drive member and the lifting mechanisms.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF EMBODIMENTS OF THE INVENTION

Figure 1:
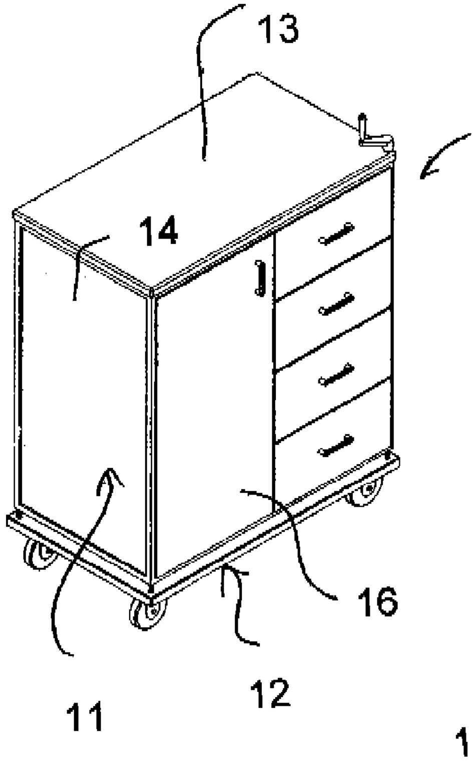
FIG. 1 is an isometric view of a cart according to the present invention.
Figure 2:
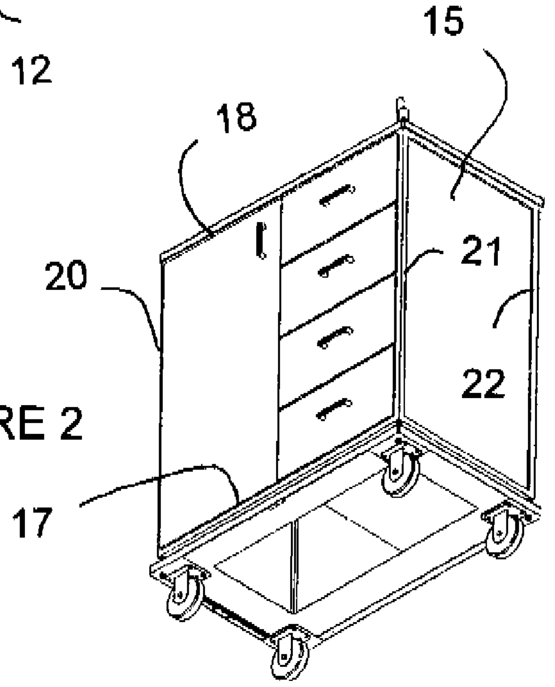
FIG. 2 is an isometric view of the cart of FIG. 1 showing the bottom and opposite end.

A medication cart generally indicated at 10 comprises a housing 11 carried on a base 12. The housing 11 has a top work surface 13, two side walls 14 and 15, a front wall 16 and a rear wall opposite to the front wall.

The top work surface 13 is horizontal and generally plain although it may include receptacles for various components such as computers, bar code readers and the like which are known to a person skilled in the art and assist the operator of a cart of this type with the dispensing of the medications.

The housing 11 is formed from a rectangular bottom frame 17, a rectangular top frame 18 and four connecting posts 19, 20, 21 and 22. The frame members are formed from square tubing which is suitably connected at the corners to provide a generally rigid structure. The frame work is then covered by panels to form the sides and top of the housing.

Figure 6:
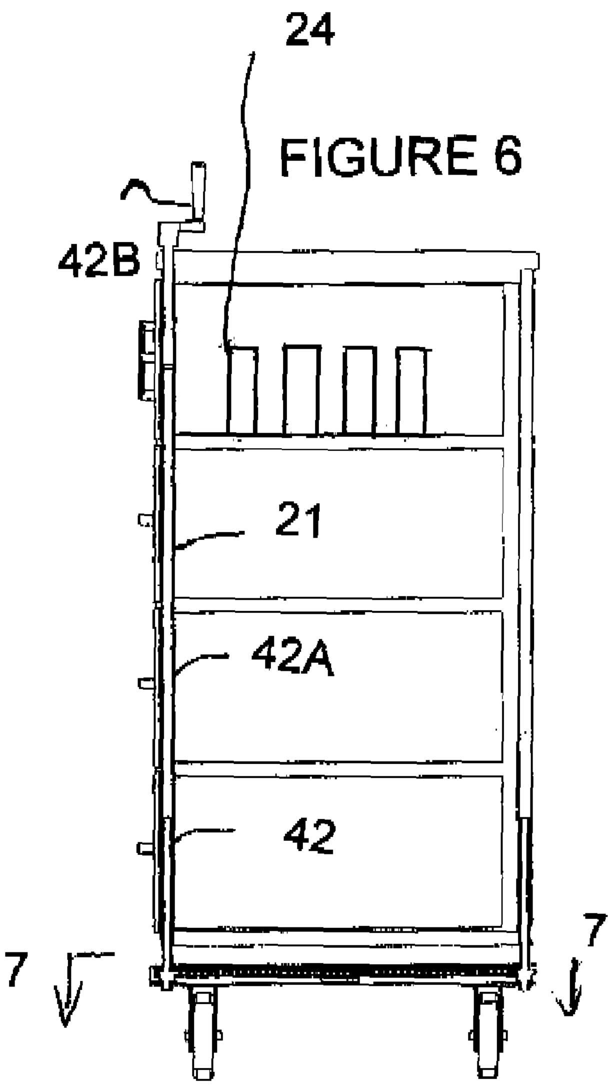
FIG. 6 is a vertical cross section through the cart of FIG. 1, the cross section being taken along the lines 6—6 of FIG. 5.
Figure 7:
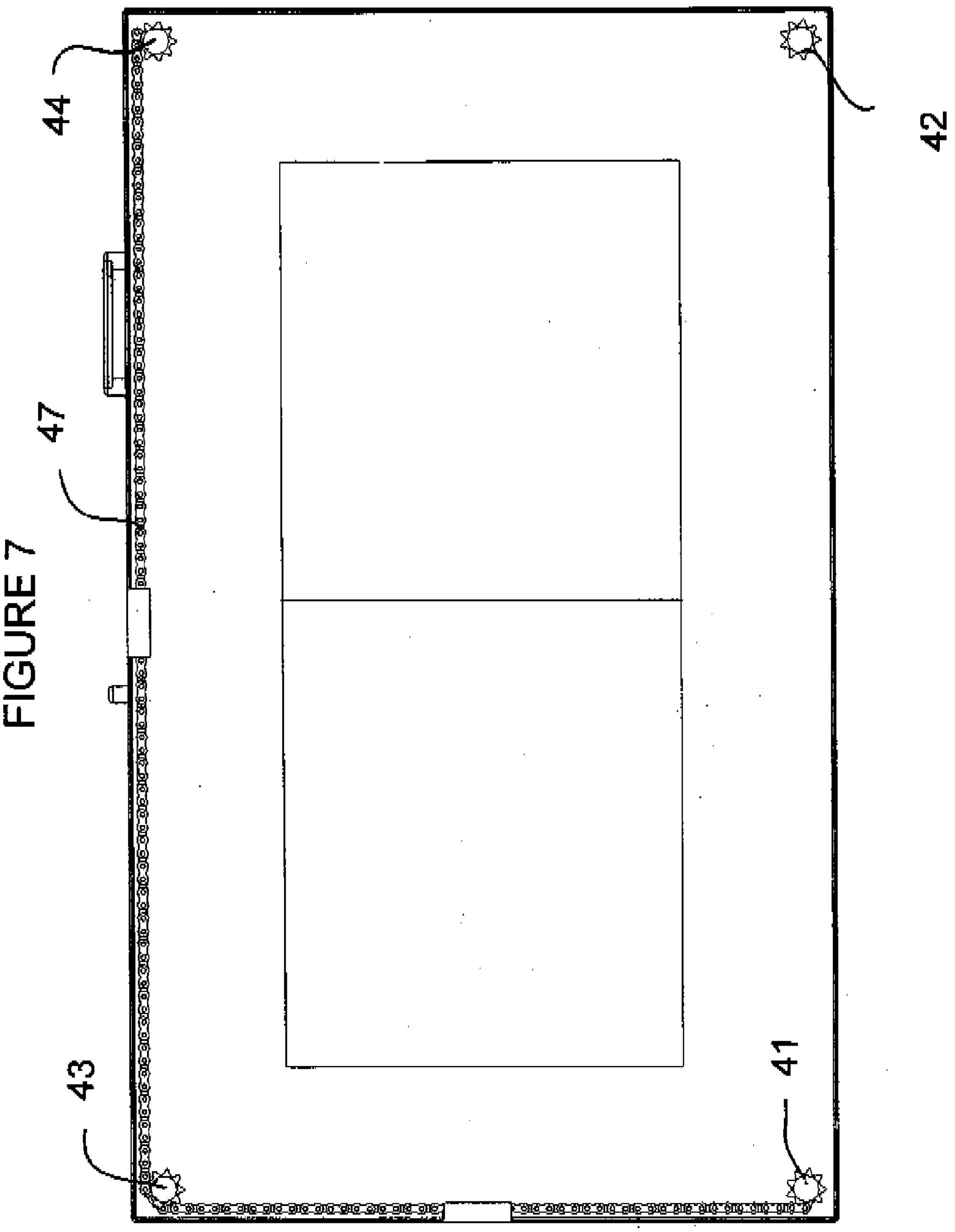
FIG. 7 is a cross sectional view along the lines 7—7 of FIG. 6.
Figure 8:
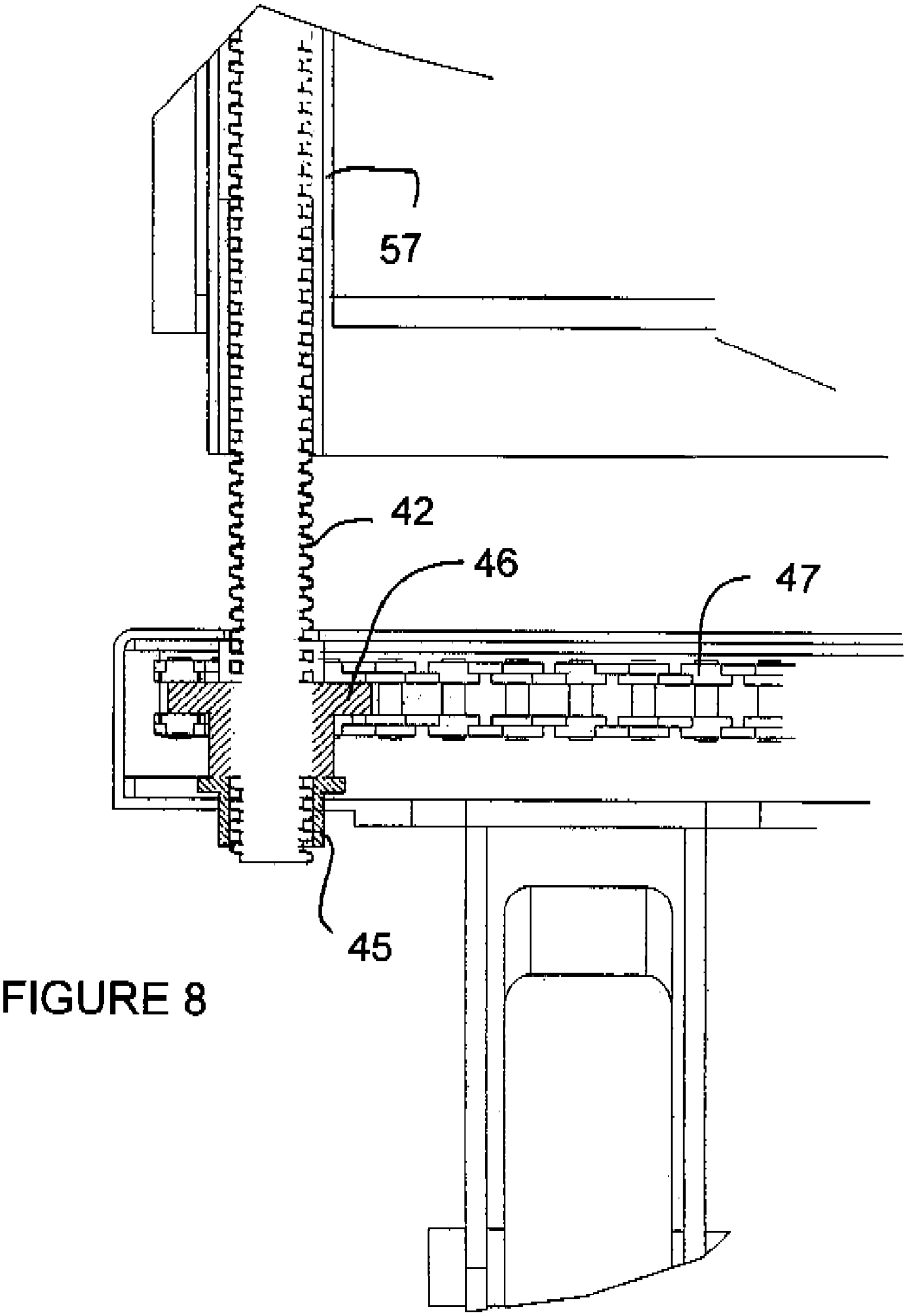
FIG. 8 is an enlarged view of one portion of the structure of FIG. 6 showing one post and its associated lifting system.

The housing contains a series of compartments which can be located and arranged in accordance with requirements. In the embodiments shown there are a series of separate drawers 23 which are mounted on sliders carried in the housing so that each drawer can be moved from a stored position within the housing to an open position allowing access to the interior of the drawer. Each drawer includes a series of support elements 24 shown schematically in FIG. 6 which allow the drawers to receive and contain cards of medications and data or other information relating to the patients. Various types of storage systems can be used. The medications are generally but not necessarily contained on blister packs so that each patient has their requirement suitably stored in an arrangement which can be readily dispensed by the operator.

Details of one example of arrangement of this type can be found by studying the products available by the assignee to this present application. Information relating to these products is well known to a person skilled in the art and is incorporated herein by reference.

Figure 3:
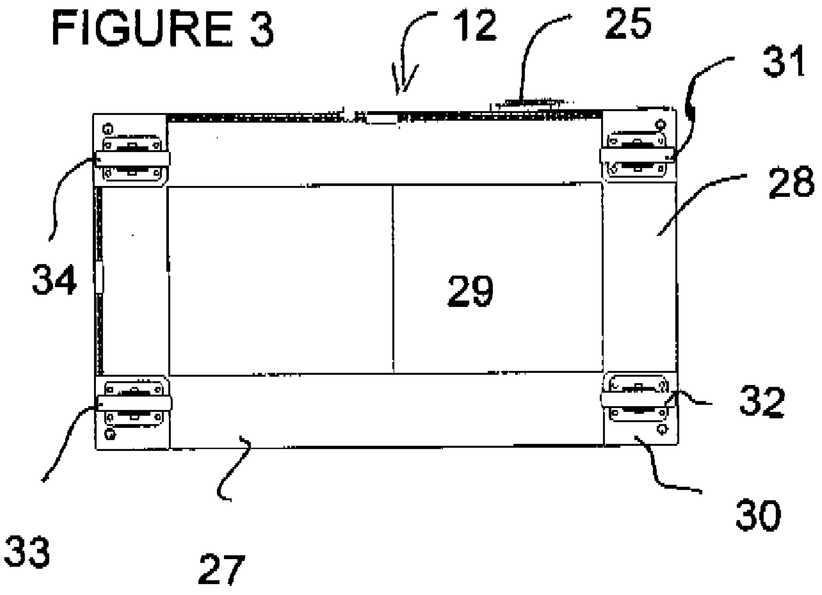
FIG. 3 is a bottom plan view of the cart of FIG. 1.
Figure 4:
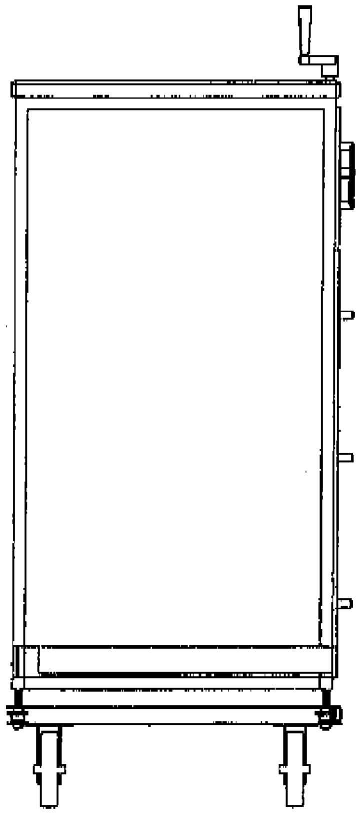
FIG. 4 is an end elevational view of the cart of FIG. 1.
Figure 5:
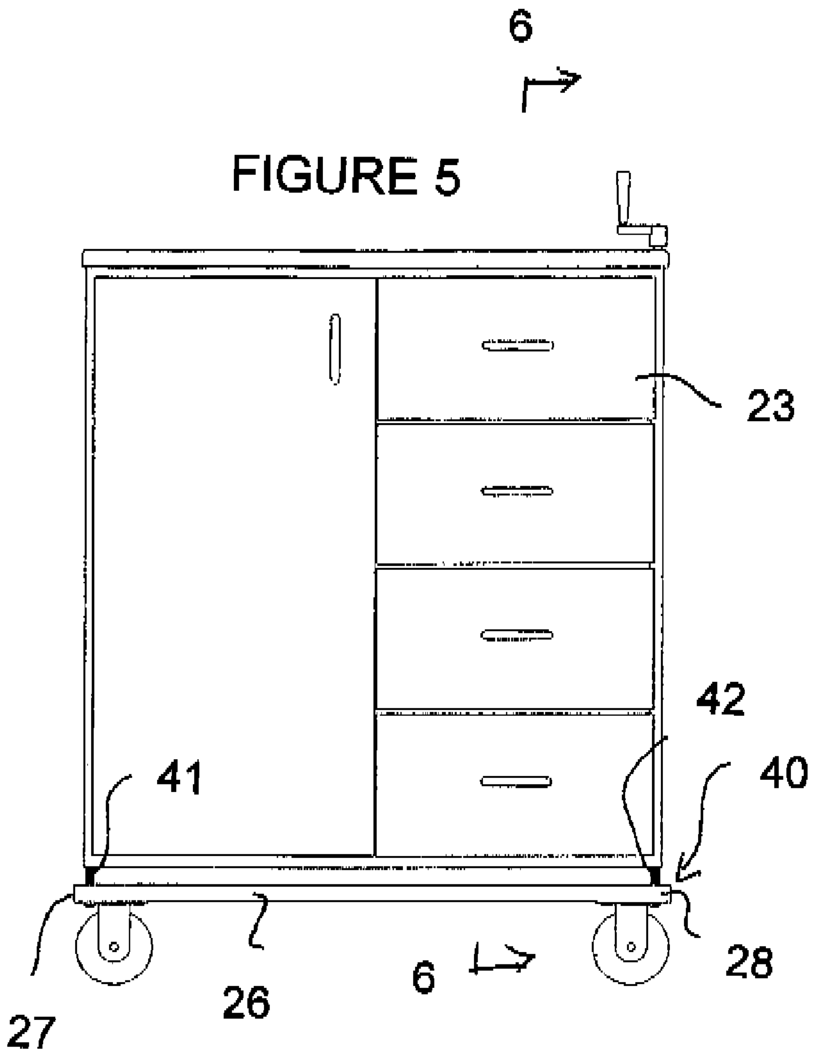
FIG. 5 is a front elevational view of the cart of FIG. 1.

The base 12 as best shown in the bottom view of FIG. 3 is defined by an exterior tubular frame 25 including a front frame member 26, two side frame members 27 and 28 and a rear frame member 27. These are partly covered by plates 28 leaving an open center section 29 so as to reduce the weight of the structure. At each corner is mounted a wheel mount 30. Two of the wheel mounts include fixed wheels 31 and 32 and two of the wheel mounts include castor wheels 33 and 34 so that the base which carries the housing can be wheeled from place to place easily by the operator. The number of wheels can of course be reduced by providing a single wheel at the front or rear.

There is provided a lifting system 40 for raising and lowering the housing relative to the base 12. The lifting system 40 comprises 4 threaded rods 41, 42, 43 and 44. Each threaded rod is attached to the base at a respective corner and is carried on bearings 45 so that the threaded rod is free to rotate around its axis but is supported against axial movement or side to side movement on the base by the fixed mounting of the bearing 45 on the base.

Each of the threaded rods carries a sprocket 46 at its lower end immediately adjacent the bearing 45 and located within the height of the base. The sprockets of the four threaded rods are arranged in a common plane within the base. A chain 47 is engaged around all of the sprockets so that the chain 47 passes around the base from each sprocket to the next closely adjacent the peripheral edge of the base.

Each of the threaded rods extends into a respective one of the posts 19, 20, 21 and 22 so that the threaded rod is located freely inside the respective post. The post carries a nut 57 in the form of a sleeve which is fastened inside the post and is held against axial or rotational movement relative to the post. This is conveniently formed by casting into the interior of the post a plastics member which defines a female thread on its inside surface and has an outside surface engaging the interior of the post. Thus the threaded rod engages into the female thread on the member within the post. In this way rotation of the threaded rod causes the nut to move axially along the threaded rod.

As the threaded rods are interconnected by the sprockets 46 and the chain 47, rotation of one of the threaded rods is communicated to common rotation of each of the threaded rods thus driving the screw jack arrangement formed by the threaded rods and its cooperating nut to commonly and simultaneously lift the housing relative to the base.

One of the threaded rods or the chain can be driven by a motor attached to the base or the housing. Thus for example an additional sprocket may be provided on the chain which connects to a motor which drives the chain around the periphery thus driving each sprocket and thus causing common rotation of the threaded rods. The motor can be driven by battery power using a switch provided at a suitable location and movable by the operator to cause the lifting movement.

In the alternative, as shown, one of the rods 42 includes an extension portion 42A which extends through the respective post 21 to an upper end which projects through the upper end of the post and through the upper surface 13 so as to be exposed at the upper end of the housing. A hand crank 42B can be permanently attached to the threaded rod or can be provided as a separate element for attachment to the upper portion 42A of the threaded rod. In this way actuation of the hand crank by the operator will very simply cause the rotation of the rod 42 and therefore the rods of each of the posts.

In this way the operator can readily adjust the height of the work surface to a required height suitable for the operator.

The device provides a simple construction which can be inexpensively manufactured and is robust requiring little or no maintenance. The weight of the housing is relatively low so that the amount of manual effort necessary to effect the movement of the housing using a simple hand crank is small. The chain and sprockets can be located simply within the base so as to avoid any increase in size or complexity of the structure. The threaded rods are conveniently housed within the posts with only the relatively small portion of the threaded rod between the base and the bottom of the housing being exposed.

As will be apparent to those skilled in the art in the light of the foregoing disclosure, many alterations and modifications are possible in the practice of this invention without departing from the spirit or scope thereof.

The invention claimed is:

1. A medication cart comprising:

a frame having a plurality of upstanding posts at spaced corners of the frame;

a generally horizontal counter top connected to the frame and providing a work surface for receiving work materials involved in dispensing medications;

a plurality of drawers carried on the frame underneath the counter top for sliding movement from a closed position within the frame to an open position allowing access to an interior of the drawers;

the drawers having locations therein for containing medications and for containing data charts relating to medications to be dispensed to a number of patients;

a base for supporting the frame and the drawers therein;

a plurality of ground wheels mounted on the base by which the base and the frame carried thereon can be wheeled by an operator over the ground to different locations to service a series of patients with the medications;

each of the posts having a screw lifting jack mounted therein by which the post and the frame can be lifted relative to the base to raise the height of the counter top to accommodate different heights of the operator;

and a drive transmission for transferring drive to each of the screw lifting jacks for simultaneous actuation of the screw lifting jacks to raise the frame relative to the base.

2. The medication cart according to claim 1 wherein each screw lifting jack includes a threaded rod extending longitudinally of the respective post within the respective post and a nut mounted on the threaded rod.

3. The medication cart according to claim 2 wherein the drive transmission is arranged to drive rotation of the threaded rods and wherein each nut is mounted on the frame such that rotation of the threaded rod causes movement of the nut along the threaded rod and lifting of the frame.

4. The medication cart according to claim 1 wherein the drive transmission includes a drive coupling mounted on the base for communicating drive to each of the threaded rods.

5. The medication cart according to claim 1 wherein one threaded rod includes an element thereof which extends to a top of the respective post and carries a drive member at the top such that drive to all of the threaded rods is communicated from the drive member.

6. The medication cart according to claim 5 wherein the drive member comprises a hand crank.

7. The medication cart according to claim 4 wherein the drive coupling comprises an endless flexible drive member which passes around a drive connection to each of the rods.

8. The medication cart according to claim 7 wherein the endless flexible drive member comprises a chain which engages a sprocket on the respective rod.

9. A medication cart comprising:

a frame having a plurality of upstanding posts at spaced corners of the frame;

a generally horizontal counter top connected to the frame and providing a work surface for receiving work materials involved in dispensing medications;

a plurality of drawers carried on the frame underneath the counter top for sliding movement from a closed position within the frame to an open position allowing access to an interior of the drawers;

the drawers having locations therein for containing medications and for containing data charts relating to medications to be dispensed to a number of patients;

a base for supporting the frame and the drawers therein;

a plurality of ground wheels mounted on the base by which the base and the frame carried thereon can be wheeled by an operator over the ground to different locations to service a series of patients with the medications;

each of the posts having a threaded rod therein extending axially therealong with a lower end of each rod attached to the base;

each threaded rod having mounted thereon a respective nut connected to the frame such that rotation of the rods causes axial movement of the nut along the rod and lifting of the frame relative to the base;

and a drive transmission for transferring drive to each of the threaded rods for simultaneous rotation of the threaded rods to raise the frame relative to the base.

10. The medication cart according to claim 9 wherein the drive transmission includes a drive coupling mounted on the base for communicating drive to each of the rods.

11. The medication cart according to claim 9 wherein one rod extends to a top of the respective post and carries a drive member at the top such that drive to all of the rods is communicated from the drive member.

12. The medication cart according to claim 11 wherein the drive member comprises a hand crank.

13. The medication cart according to claim 10 wherein the drive coupling comprises an endless flexible drive member which passes around a drive connection to each of the rods.

14. The medication cart according to claim 13 wherein the endless flexible drive member comprises a chain which engages a sprocket on the respective rod.

15. A medication cart comprising:

a housing;

a generally horizontal counter top at the top of the housing and providing a work surface for receiving work materials involved in dispensing medications;

a plurality of drawers in the housing underneath the counter top for sliding movement from a closed position within the frame to an open position allowing access to an interior of the drawers;

the drawers having locations therein for containing medications and for containing data charts relating to medications to be dispensed to a number of patients;

a base for supporting the housing and the drawers therein;

a plurality of ground wheels mounted on the base by which the base and the frame carried thereon can be wheeled by an operator over the ground to different locations to service a series of patients with the medications;

a lifting mechanism for lifting the housing relative to the base including a plurality of threaded rods extending generally upwardly between the base and the housing with a lower end of each rod attached to the base;

each threaded rod having mounted thereon a respective nut such that rotation of the rods causes axial movement of the nut along the rod and lifting of the housing relative to the base;

and a drive transmission for transferring drive to each of the lifting mechanisms for simultaneous action in lifting the housing relative to the base including an endless flexible drive member extending around each of the lifting mechanisms in turn and a drive coupling connected between the endless drive member and the lifting mechanisms.

16. The medication cart according to claim 9 wherein the endless drive member drives the threaded rods through respective sprockets.

17. The medication cart according to claim 9 wherein one of the threaded rods includes a portion which extends to a top of the housing and carries a drive member at the top such that drive to all of the rods is communicated from the drive member.

18. The medication cart according to claim 17 wherein the drive member comprises a hand crank.

* * * * *